United States Patent
Ogawa et al.

(10) Patent No.: US 8,107,521 B2
(45) Date of Patent: Jan. 31, 2012

(54) EQUALIZER DEVICE

(75) Inventors: Daisuke Ogawa, Kawasaki (JP); Takashi Dateki, Kawasaki (JP); Hideto Furukawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 863 days.

(21) Appl. No.: 12/027,386

(22) Filed: Feb. 7, 2008

(65) Prior Publication Data

US 2008/0130733 A1   Jun. 5, 2008

Related U.S. Application Data

(63) Continuation of application No. PCT/JP2005/016343, filed on Sep. 6, 2005.

(51) Int. Cl.
*H03H 7/30* (2006.01)

(52) U.S. Cl. ........................................ 375/232

(58) Field of Classification Search .................. 375/229, 375/230, 231, 232, 233
See application file for complete search history.

(56) References Cited

U.S. PATENT DOCUMENTS

| | | | |
|---|---|---|---|
| 5,511,068 A | 4/1996 | Sato | |
| 6,087,986 A * | 7/2000 | Shoki et al. | 342/383 |
| 6,216,148 B1 * | 4/2001 | Moran et al. | 708/819 |
| 6,289,045 B1 * | 9/2001 | Hasegawa et al. | 375/231 |
| 6,577,686 B1 * | 6/2003 | Koga et al. | 375/347 |
| 6,968,211 B2 | 11/2005 | Miya | |
| 7,532,667 B2 * | 5/2009 | Pan et al. | 375/229 |
| 7,561,864 B2 * | 7/2009 | Maalouli et al. | 455/286 |
| 7,570,690 B2 * | 8/2009 | Pietraski et al. | 375/229 |
| 2002/0160814 A1 | 10/2002 | Miya | |
| 2002/0191568 A1 | 12/2002 | Ghosh | |
| 2003/0227960 A1 * | 12/2003 | Papasakellariou | 375/147 |
| 2005/0220220 A1 * | 10/2005 | Belotserkovsky | 375/316 |
| 2006/0098726 A1 * | 5/2006 | Pan et al. | 375/229 |
| 2009/0080506 A1 * | 3/2009 | Banna et al. | 375/230 |

FOREIGN PATENT DOCUMENTS

| | | |
|---|---|---|
| EP | 1 168 659 | 1/2002 |
| JP | 7-177569 | 7/1995 |
| JP | 2001-203619 | 7/2001 |
| JP | 2001-237796 | 8/2001 |
| JP | 2002-271430 | 9/2002 |
| JP | 2004-519959 | 7/2004 |
| WO | 02/080379 | 10/2002 |

OTHER PUBLICATIONS

International Search Report dated Oct. 18, 2005, from the corresponding International Application.

(Continued)

*Primary Examiner* — Jaison Joseph
(74) *Attorney, Agent, or Firm* — Fujitsu Patent Center

(57) ABSTRACT

An equalizer device which enables tap coefficient correction accuracy to be improved to enable high-quality adaptive equalization. A tap coefficient filter corrects tap coefficients thereof in accordance with a control signal and equalizes a received signal in which a data signal is multiplexed with a pilot signal, which is a known signal for compensating for variation in reception of the data signal. A training signal setter sets both of the data signal and the pilot signal as a training signal, which indicates an ideal value of equalized output. A tap coefficient corrector obtains an error signal indicative of a differential value between the training signal and a filter output signal which is output from the tap coefficient filter after being equalized, performs an adaptive algorithm operation so as to decrease the error signal, and generates the control signal for correcting the tap coefficients.

7 Claims, 13 Drawing Sheets

OTHER PUBLICATIONS

Moritz Harteneck, et al. "Practical Implementation Aspects of MMSE Equalisation in a 3GPP HSDPA Terminal" Vehicular Technology Conference, May 19, 2004, pp. 445 to 449, vol. 1.

Jingnong Yang, et al. "Tentative Chip Decision-Feedback Equalizer for Multicode Wideband CDMA" IEEE Transactions on Wireless Communications, Jan. 2005, pp. 137-148, vol. 4, No. 1.

Daisuke Ogawa, et al. "A Study on Chip Equalizers using Tentative Decision Data for HSDPA System" IEICE Communications Society Conference, Sep. 2005, p. 483.

Daisuke Ogawa, et al. "A Study on Linear Equalizer using Multipath Interference Correlative Timing" IEICE Communications Society Conference, Sep. 2004, p. 410.

* cited by examiner

EQUALIZER DEVICE

This application is a continuing application, filed under 35 U.S.C. §111(a), of International Application PCT/JP2005/016343, filed Sep. 6, 2005.

BACKGROUND OF THE INVENTION

1. Field of the Invention

The present invention relates to equalizer devices, and more particularly, to an equalizer device for performing equalization.

2. Description of the Related Art

In transmission systems, signal processing called equalization is performed. Equalization refers to a process of reducing distortion caused on transmission paths, and usually, distorted frequency characteristics are made up for by an equalizer at the receiving side.

For example, in mobile communications, radio signal undergoes multipath (phenomenon wherein a signal wave is propagated through multiple paths while being reflected by mountains, buildings and the like) before arriving at the receiving side. Consequently, the times of arrival of individual waves vary depending on the propagation path length, causing delay distortion of the transmitted waveform. Also, since the signal wave is repeatedly reflected and scattered before arriving at the receiving side, amplitude distortion occurs.

If delay distortion or amplitude distortion occurs, intersymbol interference is caused wherein the transmitted pulse overlaps with its adjacent pulses, making it impossible for the receiving side to accurately distinguish the transmitted pulse. It is therefore necessary that equalization should be performed following up change in the transmission path characteristics, in order to remove the intersymbol interference and thereby compensate for degradation in the transmission quality.

An equalizer used to perform such equalization is an adaptive equalizing filter in which a desired signal is looked up and weighting factors (tap coefficients) of the filter are adaptively set so that the phase and amplitude of the filter output may approach those of the desired signal. Generally, FIR (Finite Impulse Response) filters are widely used (the desired signal is called training signal).

The equalizer is used in W-CDMA (Wideband-Code Division Multiple Access), which is a major mobile communication scheme, in the manner described below. At the transmitting side, a pilot signal (CPICH: Common Pilot Channel) and a data signal are subjected to CDM (Code Division Multiplex) and the resulting multiplexed signal is transmitted. At the receiving side, CPICH is input, as the training signal, to the equalizer to carry out channel estimation etc.

In mobile communications, variation in the strength or phase of the received signal, namely, fading, occurs due to various factors present in the course of radio wave propagation such as multipath. Fading is a cause of increase in the information transmission error rate.

Accordingly, in W-CDMA, the transmitter performs code division multiplexing on the data signal and CPICH containing symbols whereby the receiver identifies the modulation phase of the transmitted data. The receiver refers to the phase/amplitude of the received CPICH and corrects the phase/amplitude of the data signal for channel estimation. By performing synchronous detection on the basis of the result of the channel estimation, it is possible to demodulate data with accuracy even in a fading environment.

A conventional equalizer adapted to equalize a code division multiplexed signal consisting of pilot and data signals is proposed, for example, in PCT-based Japanese Patent Publication No. 2004-519959 (paragraph nos. [0013] to [0026], FIG. 1).

There has also been proposed an equalizer in which an NLMS (Normalized Least Mean Square) adaptive algorithm is applied to CPICH as the training signal (e.g., Moritz Harteneck, Carlo Luschi, "Practical Implementation Aspects of MMSE Equalisation in a 3GPP HSDPA Terminal", VTC2004-Spring, pp. 445-449).

FIG. 13 illustrates a schematic configuration of an equalizer. The equalizer 50 comprises a tap coefficient variable filter 51, a differential calculator 52, and a tap coefficient corrector 53. The tap coefficient variable filter 51 corrects tap coefficients thereof in accordance with a control signal output from the tap coefficient corrector 53.

The differential calculator 52 obtains a differential value between a filter output signal y(n) (n represents time) output from the tap coefficient variable filter 51 and a training signal d(n), and sends the differential value, as an error signal e(n), to the tap coefficient corrector 53. The tap coefficient corrector 53 performs an algorithm operation so as to minimize the error signal e(n), and outputs the control signal for correcting the tap coefficients of the tap coefficient variable filter 51.

The error signal e(n) is given by Equation (1) below.

$$e(n)=d(n)-y(n) \qquad (1)$$

In adaptive equalizing filters, the tap coefficients are corrected so as to minimize the mean square error, which is a mean value (expected value) of squares of e(n), and not to minimize e(n) itself (since the received signal is an irregular signal containing, besides the original information, fading variation and noise, it is appropriate to use statistically processed e(n) where e(n) is regarded as an evaluation function).

Adaptive algorithm is an algorithm for successively updating the tap coefficients so that the mean square error of the error signal e(n) may be minimized, and LMS (Least Mean Square) algorithm is widely known as a typical adaptive algorithm. The LMS algorithm is used in various fields because of its stability and also because the number of computations required is small (and therefore, the circuitry can be downscaled).

In the case of correcting the tap coefficients with the use of the LMS algorithm, the filter output signal y(n) is controlled so as to approach the training signal d(n), as seen from Equation (1).

In conventional equalizers provided in receivers for performing W-CDMA wireless communication, the CPICH is used as the training signal and the tap coefficients are updated by performing an LMS algorithm operation so that the equalized filter output signal may approach the CPICH.

However, the filter output signal is derived in the W-CDMA receiver by equalizing the received signal which is a code division multiplexed signal consisting of the CPICH, as the pilot signal, and the data signal. It is therefore not desirable that the CPICH alone be used as the training signal, and the error signal obtained using only the CPICH is not accurate. For this reason, the conventional equalizers are associated with the problem that the tap coefficient correction (updating) accuracy is low.

Specifically, according to the LMS algorithm, an error between an ideal value of equalized output and an actual equalized output is obtained and the equalizer is controlled so as to reduce the error. In the conventional equalizers, however, the actual equalized output contains a sequence of the CPICH as well as a sequence of the data signal, but the training signal as the ideal equalized output value contains only the sequence of the CPICH. Thus, a differential between the signals with low correlativity is obtained for the equalization, which leads to lowering in the reception performance of the W-CDMA receiver.

Also in the conventional techniques disclosed in PCT-based Japanese Patent Publication No. 2004-519959 and "Practical Implementation Aspects of MMSE Equalisation in a 3GPP HSDPA Terminal", a known signal alone is used as the training signal to obtain an error between signals; hence it cannot be said that optimum adaptive equalization can be performed by these techniques.

SUMMARY OF THE INVENTION

The present invention was created in view of the above circumstances, and an object thereof is to provide an equalizer device improved in tap coefficient correction accuracy and thus capable of high-quality adaptive equalization.

In order to achieve the object, there is provided an equalizer device for performing equalization. The equalizer device comprises: a tap coefficient filter for correcting tap coefficients thereof in accordance with a control signal and equalizing a received signal in which a data signal is multiplexed with a pilot signal, the pilot signal being a known signal for compensating for variation in reception of the data signal; a training signal setter for setting both of the data signal and the pilot signal as a training signal, the training signal indicating an ideal value of equalized output; and a tap coefficient corrector for obtaining an error signal indicative of a differential value between the training signal and a filter output signal which is output from the tap coefficient filter after being equalized, performing an adaptive algorithm operation so as to decrease the error signal, and generating the control signal for correcting the tap coefficients.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Figure 1:
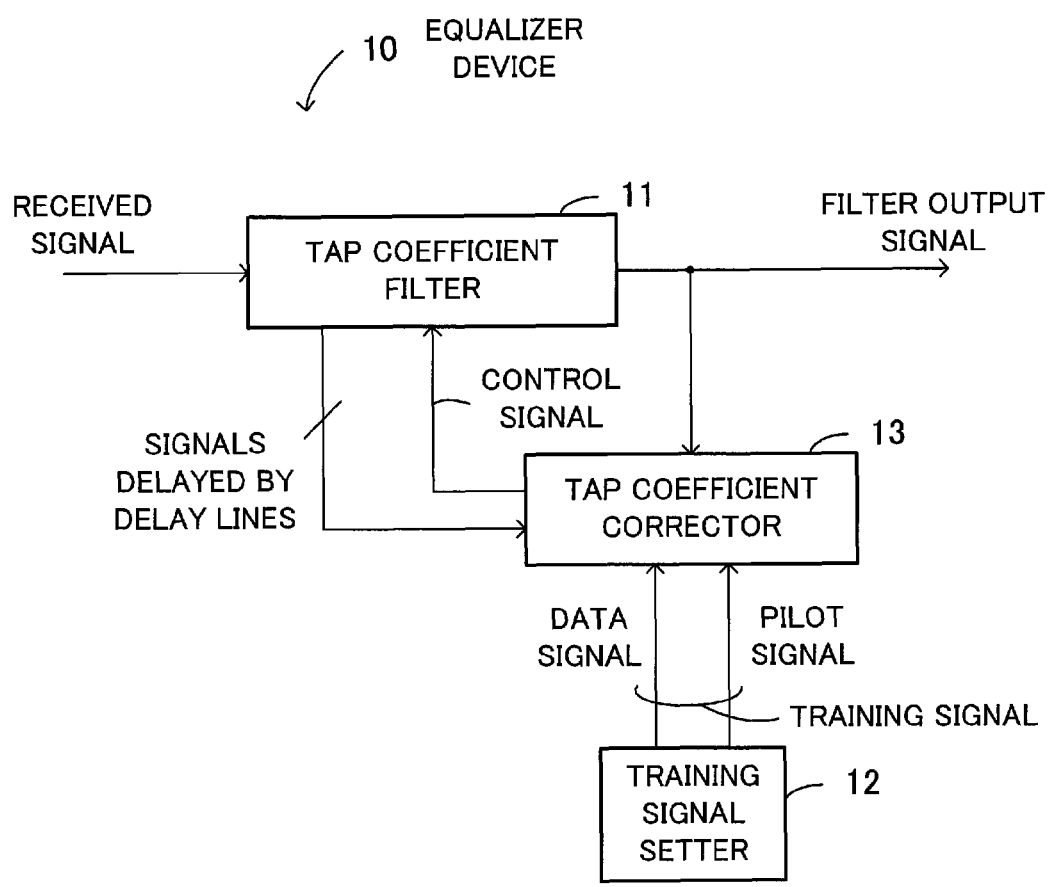
FIG. 1 illustrates the principle of an equalizer device.

Preferred embodiments of the present invention will be described below with reference to the accompanying drawings, wherein like reference numerals refer to like elements throughout. FIG. 1 illustrates the principle of an equalizer device. The equalizer device 10 comprises a tap coefficient filter 11, a training signal setter 12 and a tap coefficient corrector 13, and is adapted to equalize a received signal.

The tap coefficient filter 11 corrects tap coefficients thereof in accordance with a control signal and equalizes the received signal in which a data signal is multiplexed with a pilot signal, which is a known signal for compensating for variation in reception of the data signal.

The training signal setter 12 sets both of the data signal and the pilot signal as a training signal, which represents an ideal value of equalized output. Namely, the data signal and the pilot signal are used at the same time as the training signal.

The tap coefficient corrector 13 obtains therein an error signal indicative of a differential value between the training signal and a filter output signal which is output from the tap coefficient filter 11 after being equalized. Then, the tap coefficient corrector 13 performs an adaptive algorithm operation so as to decrease the error signal, and generates the control signal for correcting the tap coefficients which are applied to the received signal successively delayed by delay lines in the tap coefficient filter 11.

Figure 2:
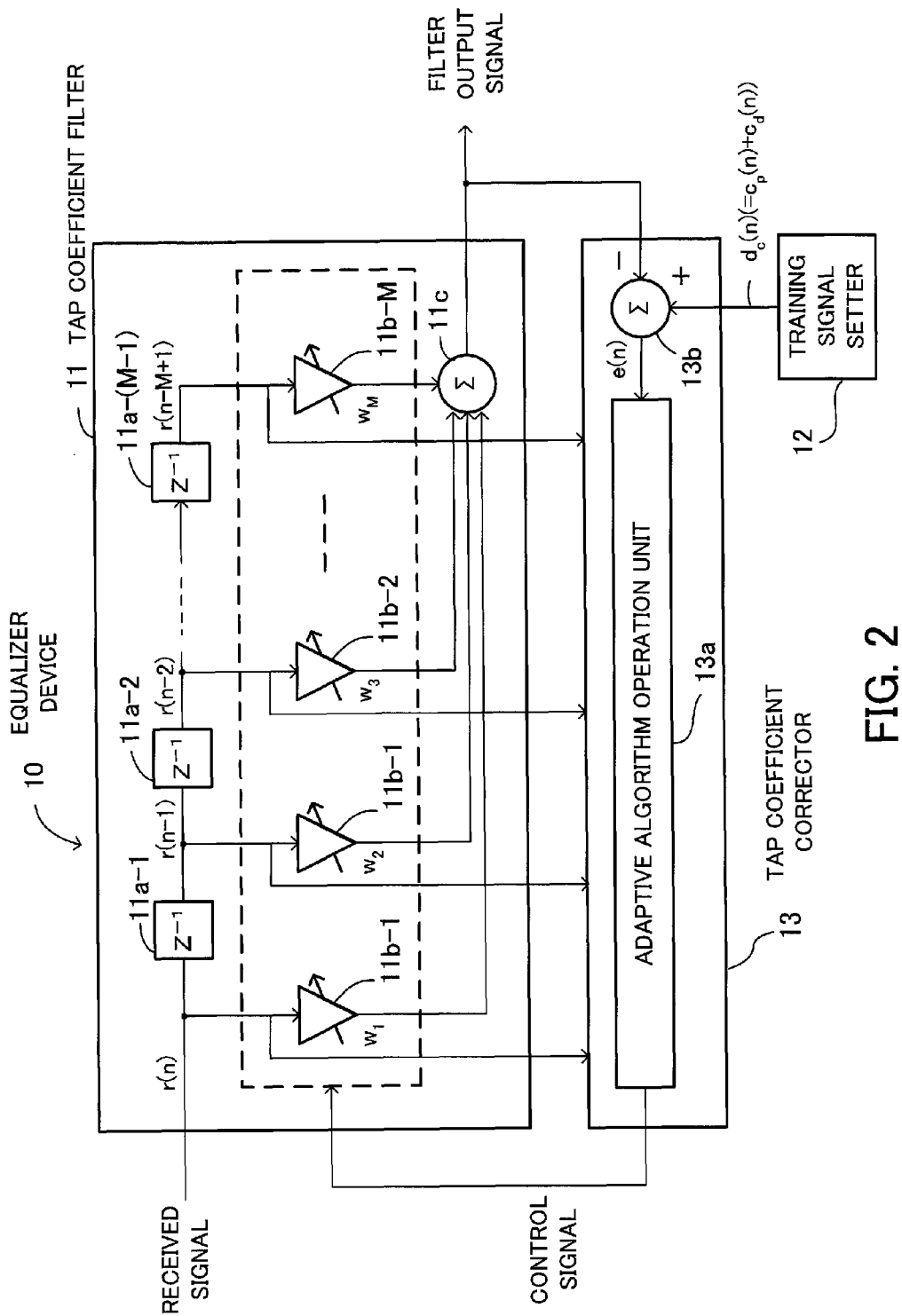
FIG. 2 shows the configuration of the equalizer device.

The configuration and operation of the equalizer device 10 will be now described in detail. The adaptive algorithm used is an LMS algorithm. FIG. 2 shows the configuration of the equalizer device 10 using a FIR filter (filter with this configuration is also called transversal filter).

The tap coefficient filter 11 includes delayers $11a$-1 to $11a$-(M−1) constituting delay lines, tap coefficient setters $11b$-1 to $11b$-M, and an adder $11c$. The tap coefficient corrector 13 includes an adaptive algorithm operation unit $13a$ and an error signal generator $13b$.

The delayers $11a$-1 to $11a$-(M−1) successively delay the received signal each for a unit time ($z^{-1}$ denotes a delay of sampling time). The tap coefficient setters $11b$-1 to $11b$-M vary their respective tap coefficients in accordance with the control signal from the adaptive algorithm operation unit $13a$, and output the delayed received signals after filtering (weighting) same. The adder $11c$ derives a sum of the signals output from the respective tap coefficient setters $11b$-1 to $11b$-M to obtain a filter output signal, and sends the filter output signal to the error signal generator $13b$.

The error signal generator $13b$ obtains a differential value between the filter output signal and the training signal and sends the differential value, as an error signal $e(n)$, to the adaptive algorithm operation unit $13a$. The adaptive algorithm operation unit $13a$ receives the received signals delayed by the respective delayers $11a$-1 to $11a$-(M−1) as well as the error signal $e(n)$, performs an operation using the LMS algorithm so as to decrease the error signal $e(n)$, and outputs the control signal for correcting the tap coefficients of the tap coefficient setters $11b$-1 to $11b$-M.

Provided the pilot signal sequence is $c_p(n)$ and the data signal sequence is $c_d(n)$, the training signal sequence $d_c(n)$ used in the equalizer device 10 is expressed by Equation (2) below (n represents time).

$$d_c(n) = c_p(n) + c_d(n) \qquad (2)$$

The tap coefficients (weights) updated in the respective tap coefficient setters $11b$-1 to $11b$-M are denoted with numbers as $w_1(n), w_2(n), w_3(n), \ldots, w_M(n)$.

Expressing the tap coefficients in vector notation as $w(n)$ provides Equation (3) below (In general, boldface is used to represent vectors or matrices. Since boldface is not to be used in the text of the specification, normal typeface is used in the text of the specification, while boldface is used in the equations. Also, signs in normal typeface indicate scalar quantities, and individual parameters are reckoned complex quantities as a general rule).

$$w(n) = \begin{bmatrix} w_1(n) \\ w_2(n) \\ w_3(n) \\ \vdots \\ w_M(n) \end{bmatrix} \quad (3)$$

The transpose of w(n) is expressed with the superscript T affixed thereto, then $w^T(n)$ is given by Equation (4) below.

$$w^T(n) = [w_1(n), w_2(n), w_3(n), \ldots, w_M(n)] \quad (4)$$

Namely, Equation (4) is a row vector derived by rewriting the column vector w(n).

The signals output from the delayers 11a-i to 11a-(M−1), which are time-series samples of the received signal, are denoted by r(n), r(n−1), r(n−2), ..., r(n−M+1), and expressing the time-series samples in vector notation provides Equation (5) below.

$$r^T(n) = [r(n), r(n-1), r(n-2), \ldots, r(n-M+1)] \quad (5)$$

Let the vector of the received signal at time n be r(n), the tap coefficient vector (hereinafter called tap weight vector) be w(n), the training signal be $d_c(n)$, the filter output signal (equalized signal) be $w^H(n)r(n)$ (H represents Hermitian transpose), and the error signal, which is the differential between the training signal and the filter output signal, be e(n), then the LMS algorithm implemented in the equalizer device 10 is given by Equation (6) below.

$$\begin{aligned} w(n+1) &= w(n) + \mu \cdot e^*(n) \cdot r(n) \quad (6) \\ &= w(n) + \mu \cdot (d_c(n) - w^H(n)r(n))^* \cdot r(n) \\ &= w(n) + \mu \cdot [(c_p(n) + c_d(n)) - \\ &\quad w^H(n)r(n)]^* \cdot r(n) \end{aligned}$$

In the equation above, * represents complex conjugate, and μ is a constant called step size (μ determines a correction amount applied at a time. If μ is small, the correction amount is also small, and therefore, the operation is stabilized but the follow-up capability is liable to lower. On the other hand, if μ is increased, the correction amount also increases, so that the follow-up capability improves but the operation tends to become unstable).

Given a matrix (vector) whose entries are complex numbers is A and a matrix obtained by replacing all entries of the matrix A with the conjugate complex numbers is denoted by A*, A* is called the Hermitian transpose (Hermitian transpose matrix) of A if the transpose matrix of A is equal to A* (if $A^T = A^*$).

In order to obtain the tap weight vector w(n+1) to be applied next time in the equalizer device 10, the tap weight vector w(n) is corrected using an update indicated by the second term of the right side of Equation (6), namely, μ·($d_c$(n)−$w^H$(n)r(n))*·r(n)), so that the filter output signal may approach the training signal.

When equalizing a received signal in which the pilot signal is multiplexed with the data signal, the conventional LMS algorithm uses only the pilot signal as the training signal. Accordingly, if the filter output signal (equalized signal of the pilot and data signals) is subtracted from the training signal (pilot signal), then it means that the error signal is obtained from the differential between signals having low correlativity, so that the tap coefficient updating accuracy is not up to a satisfactory level.

According to the LMS algorithm implemented in the equalizer device 10, on the other hand, both of the pilot signal and the data signal are used as the training signal, as seen from Equation (6). Since the error signal is obtained from the differential between signals having high correlativity, the tap coefficient updating accuracy can be improved.

In the above example, the LMS algorithm as an adaptive algorithm is applied to the case where the pilot signal, which is a known signal, and an external signal (data signal) other than the pilot signal are used as the training signal. Other algorithms requiring the training signal, such as NLMS (Normalized Least Mean Square) and RLS (Recursive Least Squares), are also applicable.

The following describes the case where the equalizer device 10 is applied to W-CDMA radio receiver. In W-CDMA, the transmitting side performs code division multiplexing (CDM) by spreading the spectrum of the CPICH and data signal, and transmits the code division multiplexed signal. The equalizer device, which is provided in a W-CDMA radio receiver, receives the code division multiplexed signal and performs adaptive equalization on the received signal.

Figure 3:
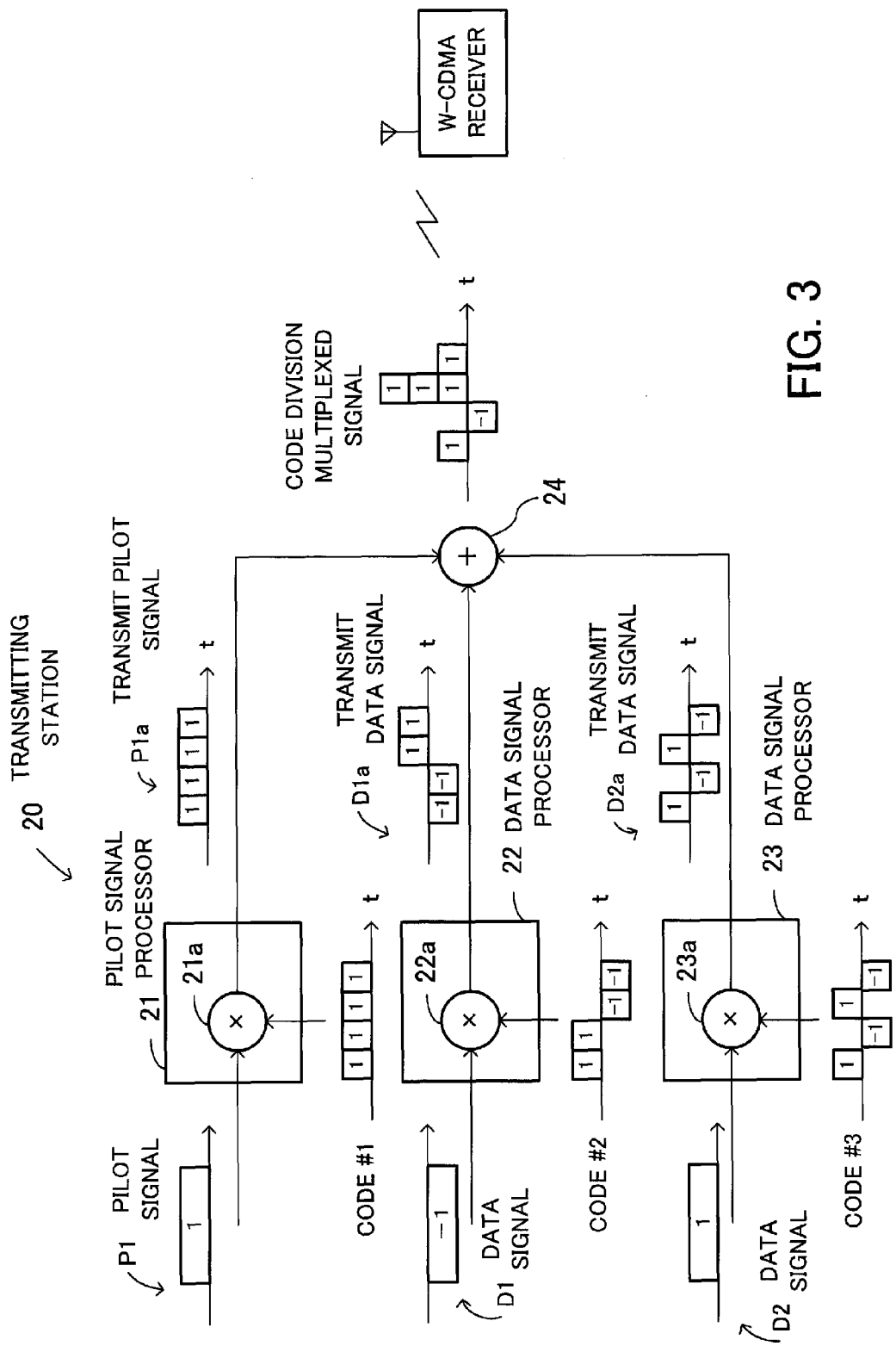
FIG. 3 illustrates the concept of code division multiplexing.

FIG. 3 illustrates the concept of the code division multiplexing. A transmitting station 20 comprises a pilot signal processor 21, data signal processors 22 and 23, and an adder 24. The pilot signal processor 21 and the data signal processors 22 and 23 include multipliers 21a to 23a, respectively.

The pilot signal processor 21 multiplies pilot signal P1 by code #1 on a chip-by-chip basis, to generate transmit pilot signal P1a. In W-CDMA, transmit information is spread using a spreading code into a wideband signal for transmission, and the sequence of the spread spectrum signal is called chip (one rectangular wave of the code is chip). In the illustrated example, the pilot signal sequence of all "1's" is multiplied by the code #1 consisting of four chips 1, 1, 1, 1, and therefore, the transmit pilot signal P1a is 1, 1, 1, 1.

The data signal processor 22 multiplies data signal D1 by code #2 on a chip-by-chip basis, to generate transmit data signal D1a. In the illustrated example, the data signal sequence of all "−1's" is multiplied by the code #2 consisting of four chips 1, 1, −1, −1, and therefore, the transmit data signal D1a is −1, −1, 1, 1.

The data signal processor 23 multiplies data signal D2 by code #3 on a chip-by-chip basis, to generate transmit data signal D2a. In the illustrated example, the data signal sequence of all "1's" is multiplied by the code #3 consisting of four chips 1, −1, 1, −1, and therefore, the transmit data signal D2a is 1, −1, 1, −1.

The adder 24 adds the transmit pilot signal P1a and the transmit data signals D1a and D2a together on a chip-by-chip basis, to generate a code division multiplexed signal. In this instance, (1, 1, 1, 1)+(−1, −1, 1, 1)+(1, −1, 1, −1)=(1, −1, 3, 1), and therefore, the code division multiplexed signal (1, −1, 3, 1) is generated. The code division multiplexed signal is then up-converted and transmitted via an antenna. The W-CDMA receiver receives the code division multiplexed signal in which the pilot and data signals are multiplexed, and equalizes the received signal.

In connection with the multiplexing of pilot and data signals, time division multiplexing (TDM) and code division multiplexing will be explained in order to make a comparison between the LMS algorithm employed in the present invention and the conventional Blind LMS algorithm.

Figure 4A:
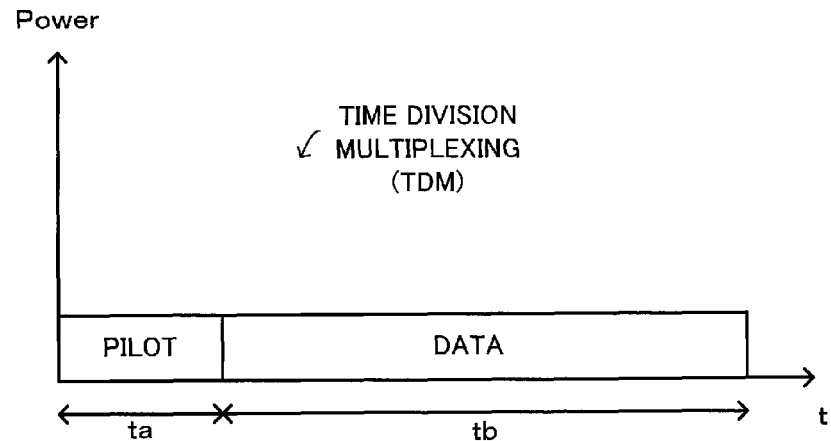
FIGS. 4A, 4B illustrate the concepts of time division multiplexing and code division multiplexing.
Figure 4B:
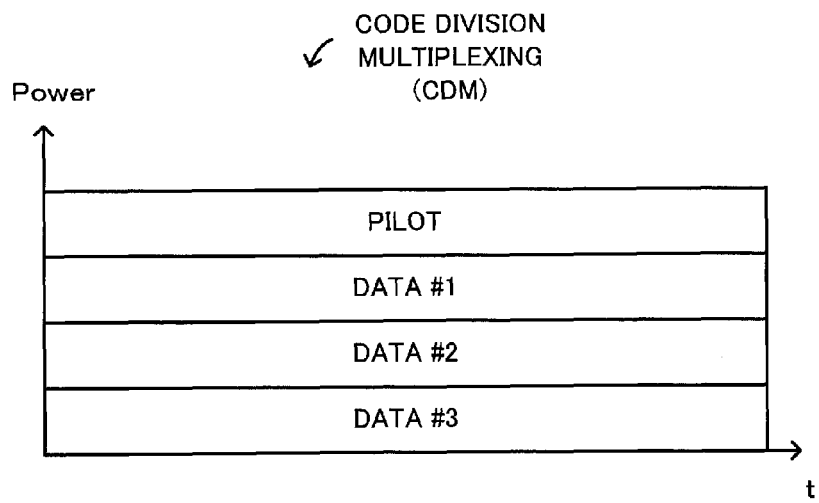

FIGS. 4A and 4B illustrate the concepts of the time division multiplexing and code division multiplexing. In the case of the time division multiplexing, the pilot signal lasts up to a certain time within a specified period of time, and the data signal occupies the remaining interval. In the case of the code division multiplexing, on the other hand, the pilot and data signals exist at any point of time.

Where the time division multiplexed signal as the received signal is to be equalized, the Blind LMS algorithm obtains tap coefficients by using the pilot signal as the training signal during the time interval ta in which the pilot signal is available, and equalizes the data signal during the time interval tb, by using the tap coefficients obtained during the time interval ta.

On the other hand, in the case of equalizing the code division multiplexed signal as the received signal, the pilot and data signals exist at any point of time. Thus, the equalizer device 10, which is adapted to equalize a code division multiplexed signal according to the LMS algorithm by using both the pilot and data signals simultaneously as the training signal, serves to improve the equalization accuracy.

The following describes exemplary configurations of the equalizer device 10 applicable to W-CDMA receiver. The equalizer device applied to W-CDMA receiver performs equalization chip by chip and, therefore, will be hereinafter referred to as chip equalizer device.

Figure 5:
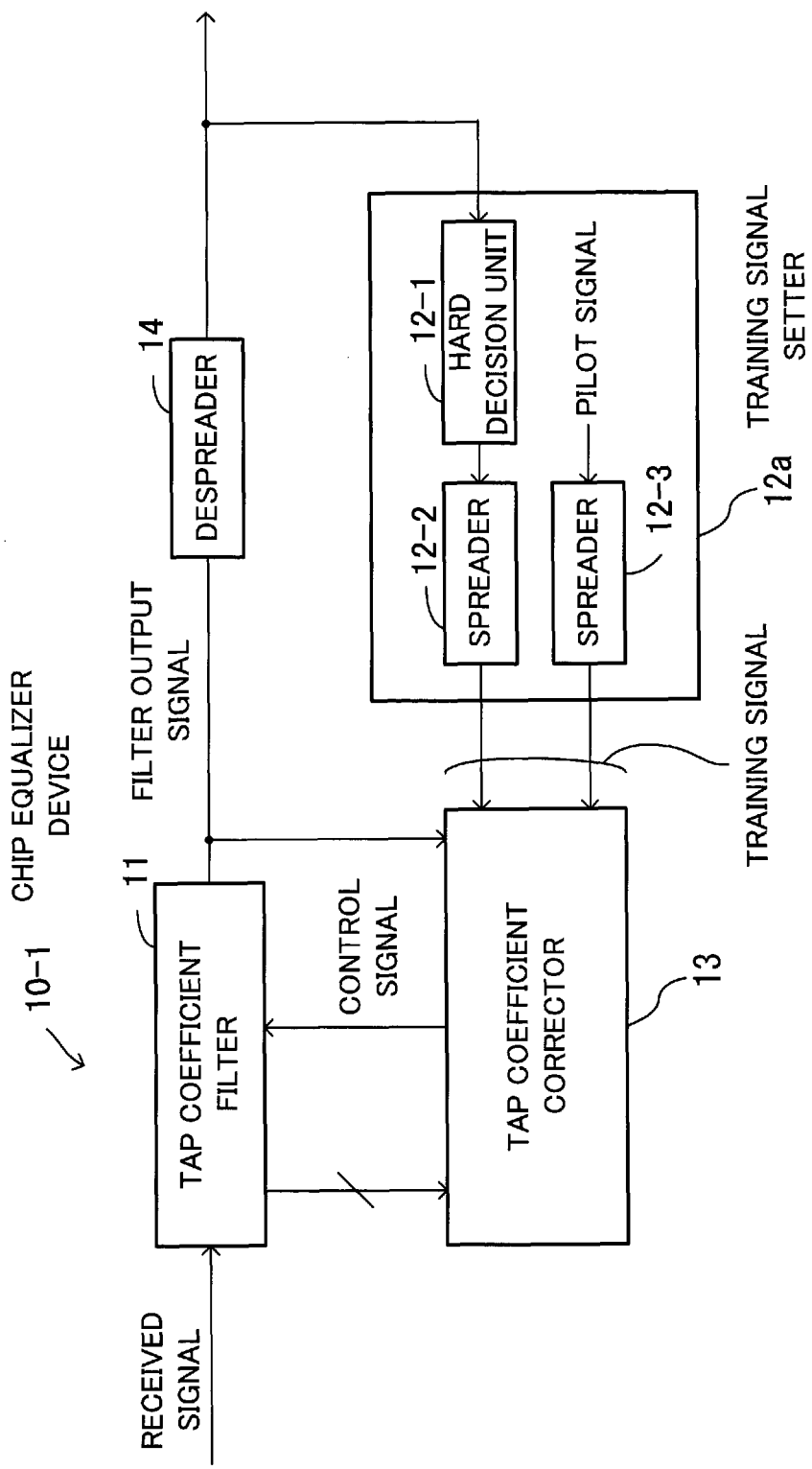
FIG. 5 shows the configuration of a chip equalizer device.

FIG. 5 shows the configuration of a chip equalizer device. The chip equalizer device 10-1 comprises the tap coefficient filter 11, a training signal setter 12a, the tap coefficient corrector 13, and a despreader 14. The training signal setter 12a includes a hard decision unit 12-1 and spreaders 12-2 and 12-3. In this and the following figures, like reference numerals are used to denote like elements, and description of the elements already explained above is omitted.

Using the same spreading code as that used for the spreading at the transmitting side, the despreader 14 despreads the filter output signal, that is, the despreader 14 performs correlation detection. The despread signal is demodulated at a subsequent stage and treated as received data.

The hard decision unit 12-1 carries out hard decision-based demodulation on the despread signal (Error correcting code is demodulated either by hard decision or by soft decision. With the hard decision, symbol values of the received signal sequence are identified as either of two levels, and with the soft decision, the symbol values are identified as one of more than two levels. Briefly, the hard decision uses a single threshold to identify each symbol as either level 0 or level 1, whereas the soft decision uses multiple thresholds to identify each symbol as one of more levels).

The spreader 12-2 spreads the data signal which has been subjected to the hard decision, in the same manner as performed at the transmitting side, to recover the same data signal as that generated at the transmitting side. The spreader 12-3 spreads the pilot signal in the same manner as performed at the transmitting side, to recover the same pilot signal as that generated at the transmitting side. The data and pilot signals processed by the spreaders 12-2 and 12-3, respectively, are input to the tap coefficient corrector 13 as the training signal.

Figure 6:
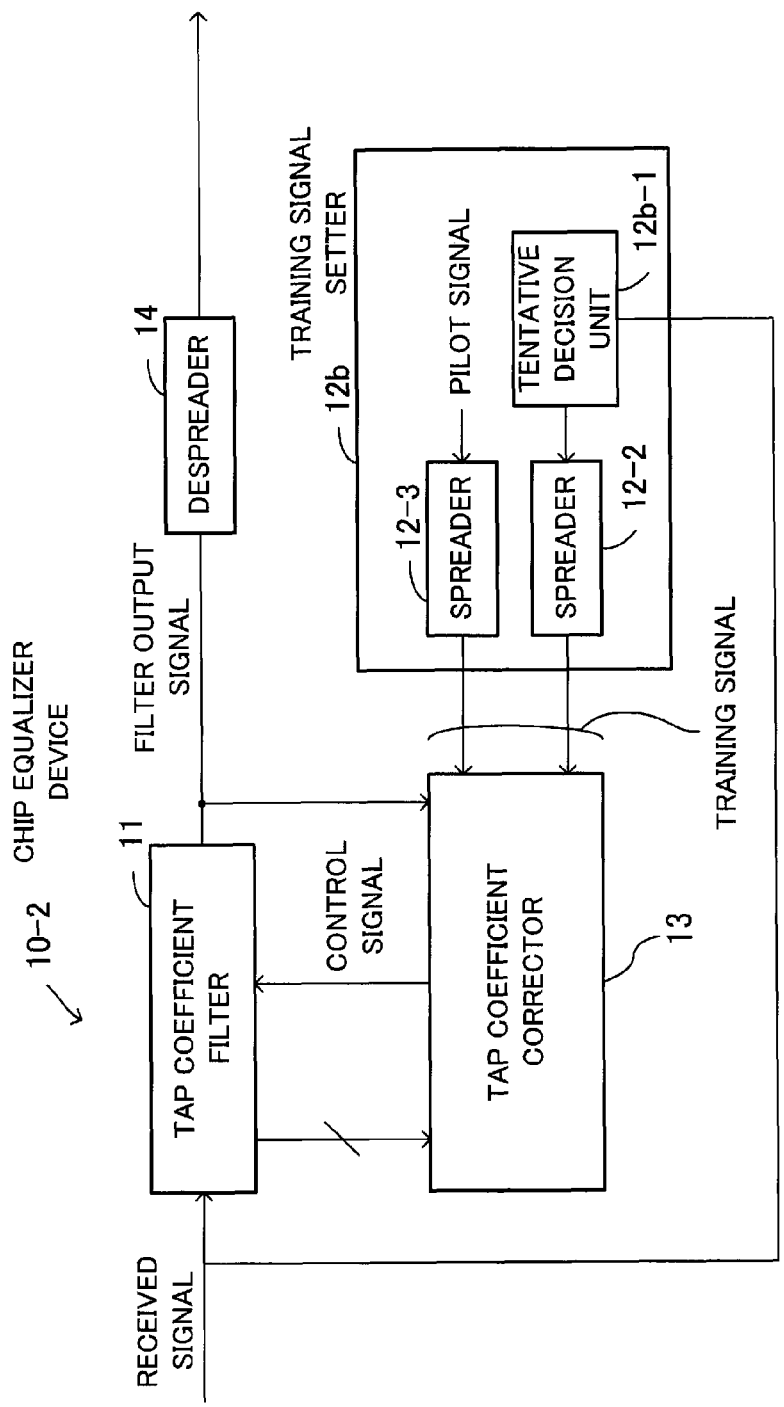
FIG. 6 shows the configuration of another chip equalizer device.

FIG. 6 shows the configuration of another chip equalizer device. The chip equalizer device 10-2 comprises the tap coefficient filter 11, a training signal setter 12b, the tap coefficient corrector 13, and the despreader 14. The training signal setter 12b includes a tentative decision unit 12b-1 and the spreaders 12-2 and 12-3.

In the chip equalizer device 10-1 of FIG. 5, the filter output signal is subjected to despreading→hard decision→spreading, and the chip sequence of the spread data signal is included in the training signal. In the chip equalizer device 10-2, by contrast, the data signal in the received signal which is not equalized yet is subjected to tentative decision, and the data signal obtained through the tentative decision is included in the training signal (tentative decision is so named because the data signal is extracted directly from the received signal which is not equalized yet and thus error is admitted in some degree).

Figure 7:
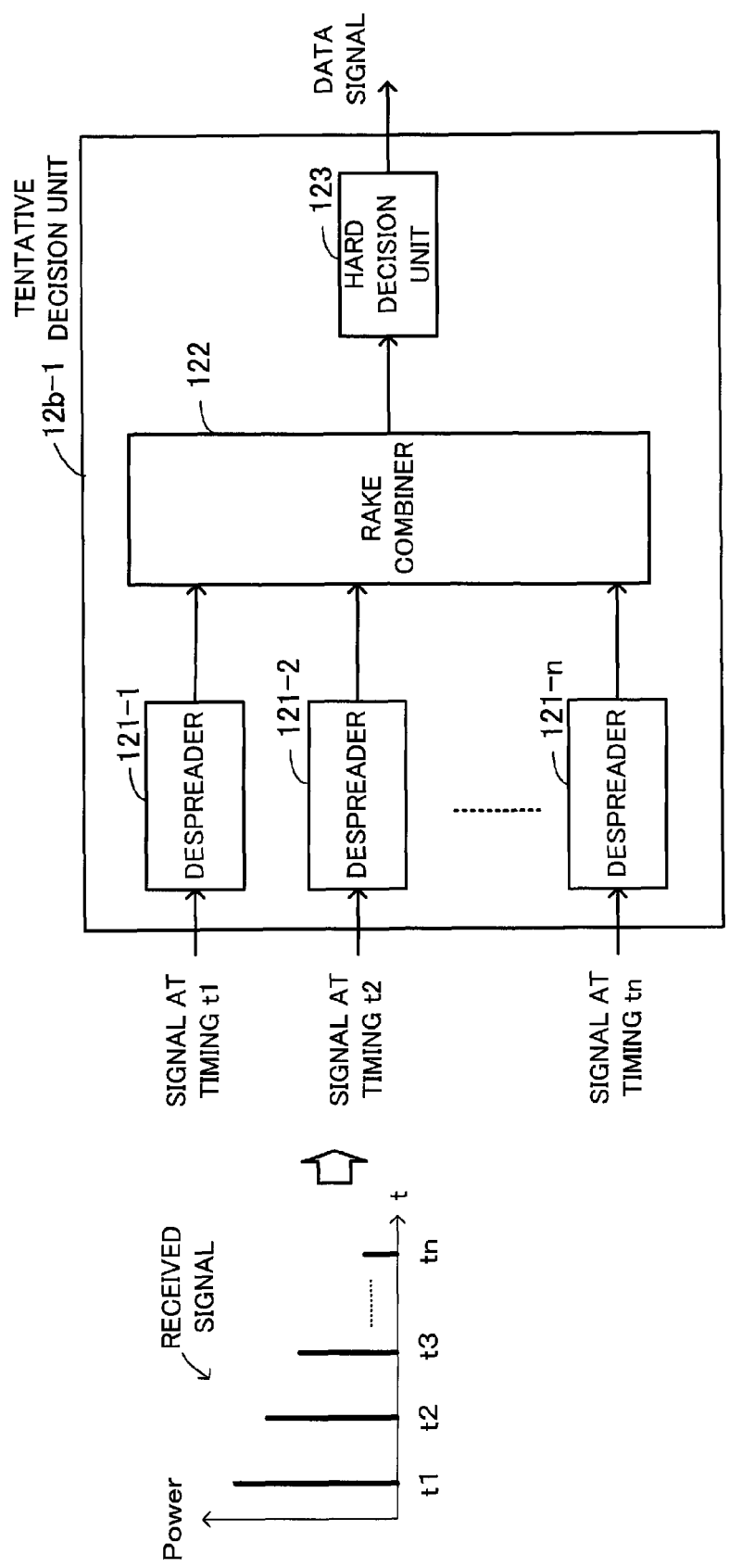
FIG. 7 shows an exemplary configuration of a tentative decision unit for data.

FIG. 7 shows an exemplary configuration of the tentative decision unit 12b-1 for data. The tentative decision unit 12b-1 includes despreaders 121-1 to 121-n, a RAKE combiner 122, and a hard decision unit 123.

It is assumed that the received signal involves multiple peaks because of multipath fading. The despreader 121-1 despreads the signal received at timing t1, and the despreader 121-2 despreads the signal received at timing t2. Similarly, the despreader 121-n despreads the signal received at timing tn.

The RAKE combiner 122 adjusts the phases of the despread signals output from the respective despreaders 121-1 to 121-n so as to bring the signals in phase, and performs an in-phase addition of the multiple despread signals. The hard decision unit 123 demodulates the added signal by means of hard decision, to generate the data signal which has been subjected to the tentative decision.

Thus, the tentative decision unit 12b-1 uses a RAKE scheme to combine the received signals by raking up signal powers that have scattered and delayed in a multipath environment, and generates the data signal with reduced fading interference.

Also, the signal which has been subjected to the hard decision in the hard decision unit 123 is spread by the spreader 12-2 and the chip sequence of the data signal is estimated. The chip sequences of the data and pilot signals are input as the training signal to the tap coefficient corrector 13.

Figure 8:
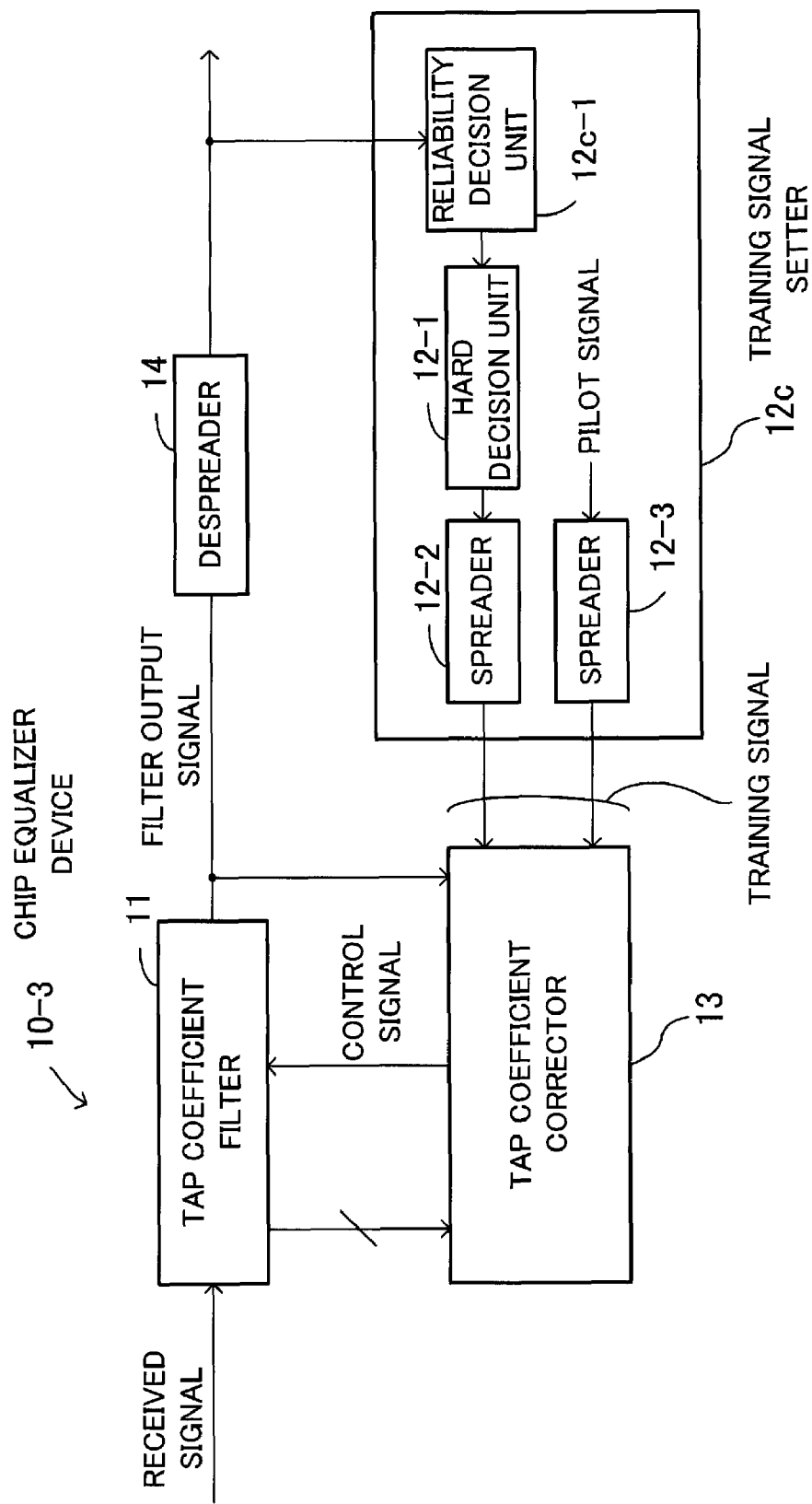
FIG. 8 shows the configuration of still another chip equalizer device.

FIG. 8 shows the configuration of still another chip equalizer device. The chip equalizer device 10-3 comprises the tap coefficient filter 11, a training signal setter 12c, the tap coefficient corrector 13, and the despreader 14. The training signal setter 12c includes a reliability decision unit 12c-1, the hard decision unit 12-1, and the spreaders 12-2 and 12-3.

Basically, according to the present invention, both of the pilot signal, which is a known signal, and the data signal, which is an unknown signal, are used as the training signal. There is a possibility, however, that the data signal output from the despreader 14 contains a significant error, and it is not desirable that such a data signal involving error be spread and used as the training signal.

Accordingly, the chip equalizer device 10-3 is provided with the reliability decision unit 12c-1 which determines the level of reliability of the data signal and decides based on the determined reliability level whether to include the data signal in the training signal.

Specifically, the reliability decision unit 12c-1 receives the despread signal from the despreader 14 and determines the reliability level of the data signal by detecting error contained therein. If it is judged as a result of the reliability determination that the signal involves significant error and thus is low in reliability, the reliability decision unit 12c-1 stops outputting the signal to the hard decision unit 12-1 so that the training signal may be set based solely on the pilot signal, without using the data signal. On the other hand, if it is judged that the signal involves little error and thus is high in reliability, the reliability decision unit 12c-1 sends the despread signal generated by the despreader 14 to the hard decision unit 12-1.

For example, to determine the reliability, the reliability decision unit 12c-1 obtains a likelihood for each bit of the despread data signal and, if the likelihood of a certain bit is lower than a threshold, judges that the data signal including that bit is unreliable. This procedure makes it possible to determine whether to include the data signal in the training signal.

The chip equalizer device 10-2 shown in FIG. 6 may of course be equipped with the reliability determination function. In this case, the reliability decision unit 12c-1 is provided in the tentative decision unit 12b-1 and between the RAKE combiner 122 and the hard decision unit 123, both shown in FIG. 7, to determine the reliability of the RAKE combined signal, whereby a decision can be made as to whether the data signal is to be included in the training signal or not.

Figure 9:
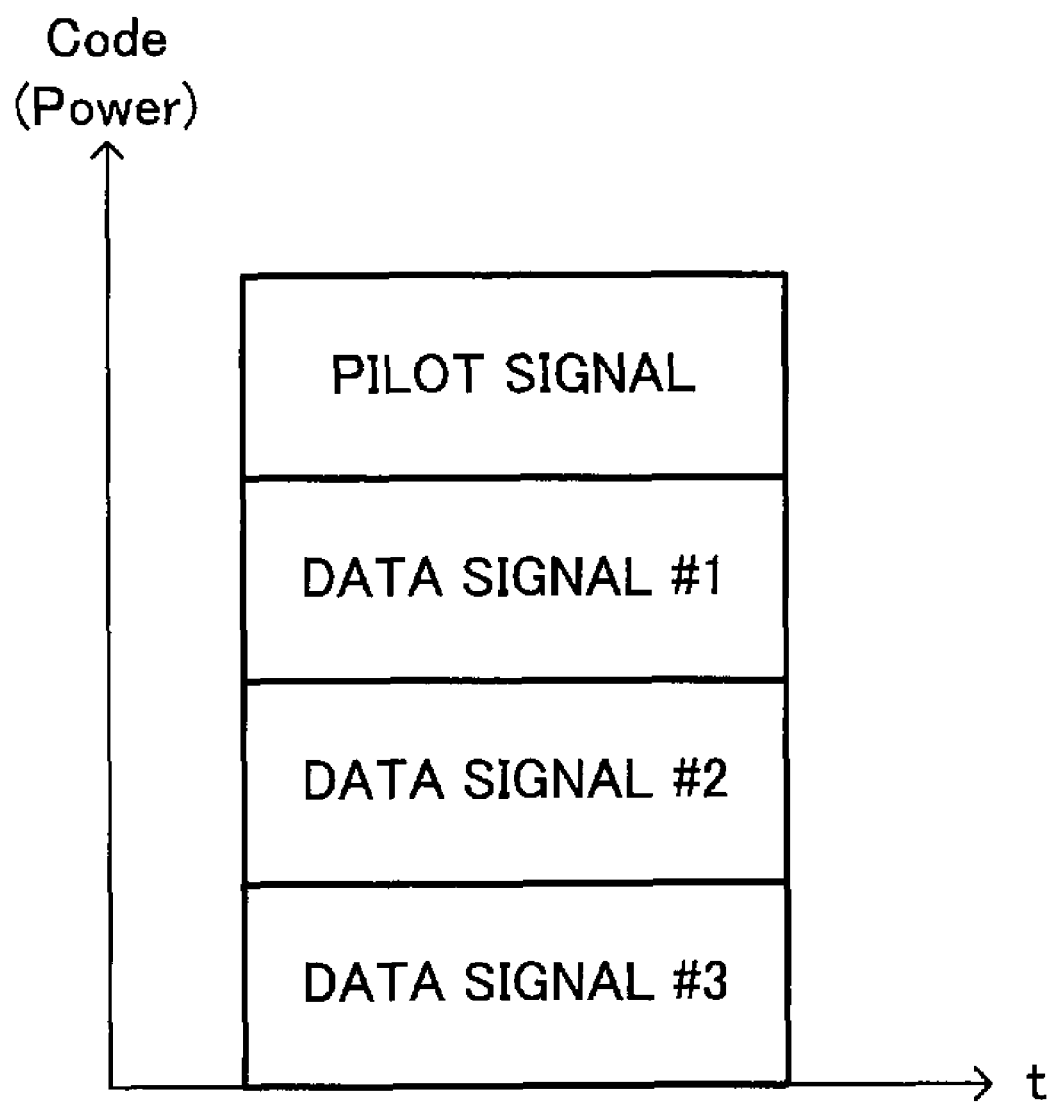
FIG. 9 illustrates code division multiplexing of pilot and data signals.

The following describes the case where the training signal is obtained using a desired one of multiple data signals which are multiplexed with the pilot signal by code division multiplexing, as shown in FIG. 9. Where the pilot signal and a plurality of data signals are multiplexed by code division multiplexing, the pilot signal and the data signals are present at an identical point of time. In the illustrated example, the pilot signal and data signals #1 to #3 exist at the same time (one pilot signal and three data signals are multiplexed by code division multiplexing).

Where such a code division multiplexed signal is being transmitted, the chip equalizer device may use the one pilot signal and all the three data signals #1 to #3 as the training signal.

Instead of using all of the multiplexed data signals #1 to #3, a desired data signal may be selected so that the selected data signal and the pilot signal may be used as the training signal.

In this case, if there is a difference in reception quality between the multiple data signals, a data signal with good reception quality is selected. For example, if the data signal #2, among the data signals #1 to #3, has good reception quality (the reception quality of the individual data signals can be detected by the reliability decision unit 12c-1), the data signal #2 and the pilot signal are used as the training signal.

In the following, computer simulation results will be described, wherein the chip equalizer device 10 is applied to data reception in an HSDPA (High Speed Downlink Packet Access) environment. First, HSDPA will be briefly explained.

HSDPA, which is based on the W-CDMA technology and reckoned a wireless access scheme for the 3.5th generation mobile communication systems, enables high-speed downlink packet transmission at a maximum rate of 14.4 Mbps (average: 2 to 3 Mbps), which is three to four times the downlink transmission rate of the existing W-CDMA, and is standardized by the 3GPP (3rd Generation Partnership Project) Release 5.

Figure 10:
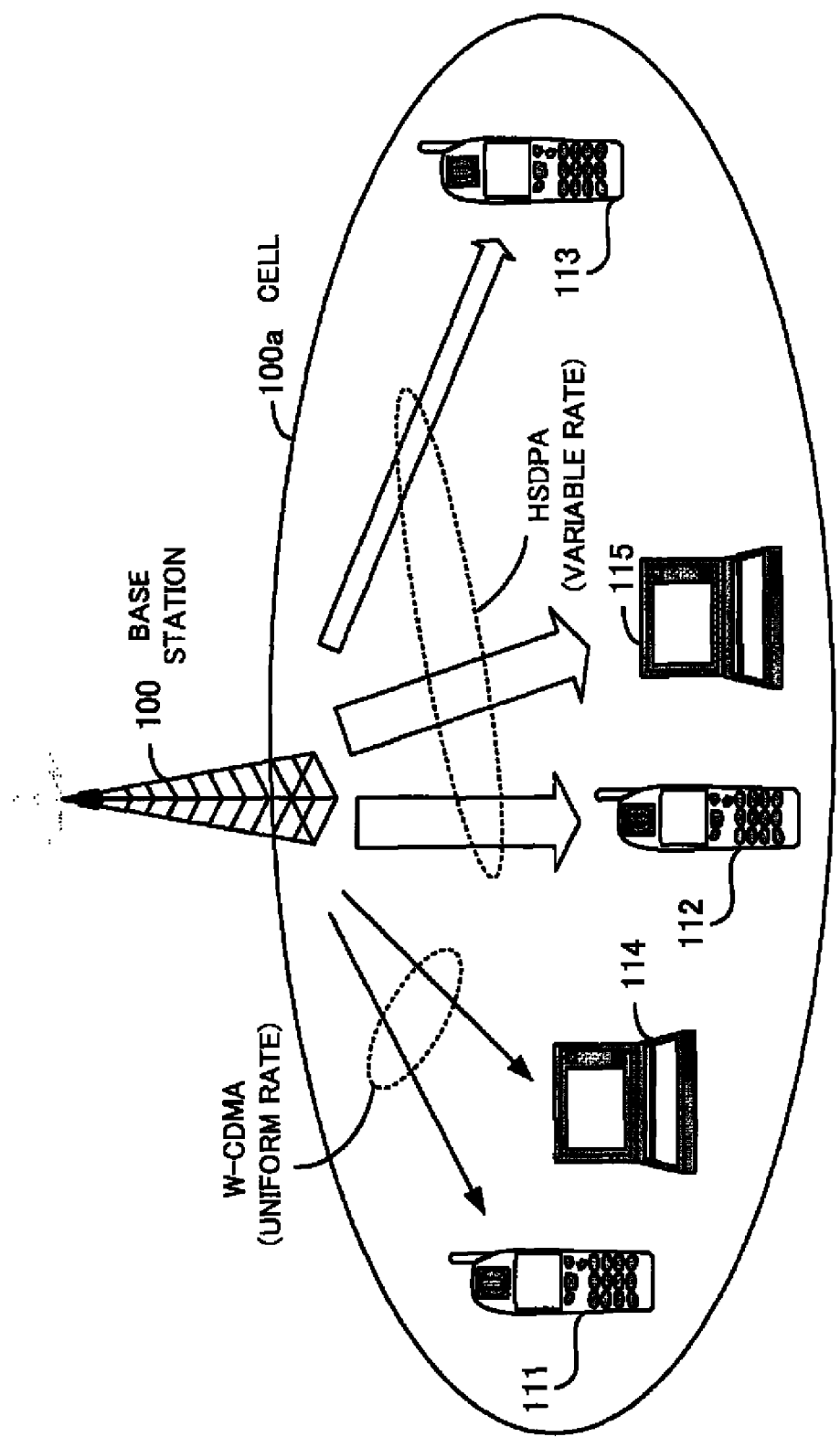
FIG. 10 illustrates an overview of HSDPA.

FIG. 10 illustrates an outline of HSDPA. Mobile phones 111 to 113 and notebook computers 114 and 115 are located within a cell 100a of a base station 100. It is assumed here that the base station 100 transmits packets to the mobile phone 111 and the notebook computer 114 by the conventional W-CDMA scheme and communicates packets to the mobile phones 112 and 113 and the notebook computer 115 by the HSDPA scheme.

In W-CDMA, packets are transmitted from the base station 100 at a uniform rate (maximum: 384 Kbps) regardless of where in the cell 100a the mobile phone 111 and the notebook computer 114 are located.

On the other hand, in HSDPA, the present radio wave reception states of individual terminals are detected and modulation schemes are switched so that the fastest modulation scheme may be selected. Accordingly, even though the terminals are located in the same cell 100a, the downlink transmission rate is changed depending on the receiving conditions such as the distance from the base station.

For example, if the mobile phone 112 and the notebook computer 115 are located near the base station 100 and are in good receiving conditions without any obstacle therebetween, the mobile phone 112 and the notebook computer 115 can receive data at a maximum rate of 14.4 Mbps. If the mobile phone 113, on the other hand, is located near the border of the cell 100a far away from the base station 100 and is in bad receiving conditions, the mobile phone 113 receives data at a lower rate than 14.4 Mbps.

Thus, in HSDPA, adaptive modulation and coding process is carried out in accordance with the receiving conditions such that the downlink transmission rate is optimized. Specifically, the modulation scheme to be used is switched between QPSK (Quadrature Phase Shift Keying: a modulation scheme in which only the phase of the carrier wave is changed to four states to transmit 2-bit information per symbol) used in the existing W-CDMA and 16 QAM (Quadrature Amplitude Modulation: a modulation scheme in which the phase and amplitude of the carrier wave are changed to create 16 states, thereby transmitting 4-bit information per symbol).

HSDPA makes the aforesaid high-speed downlink packet transmission available without the need to substantially modify the existing mobile communication networks and, because of its backward compatibility (compatibility that ensures the introduction of new systems without affecting the existing systems), is expected to become a promising technique enabling high-speed mobile communication services.

Thus, in HSDPA, the receive throughput (amount of the received signal processed per unit time) of a mobile communication unit varies depending on the receive SIR (Signal-to-Interference Ratio) of the mobile communication unit. Accordingly, by applying the chip equalizer device 10 to mobile communication units, it is possible to increase the receive SIR, compared with conventional units, and as a consequence, to improve the receive throughput (data from the base station 100 can be received and processed at a higher rate).

Figure 11:
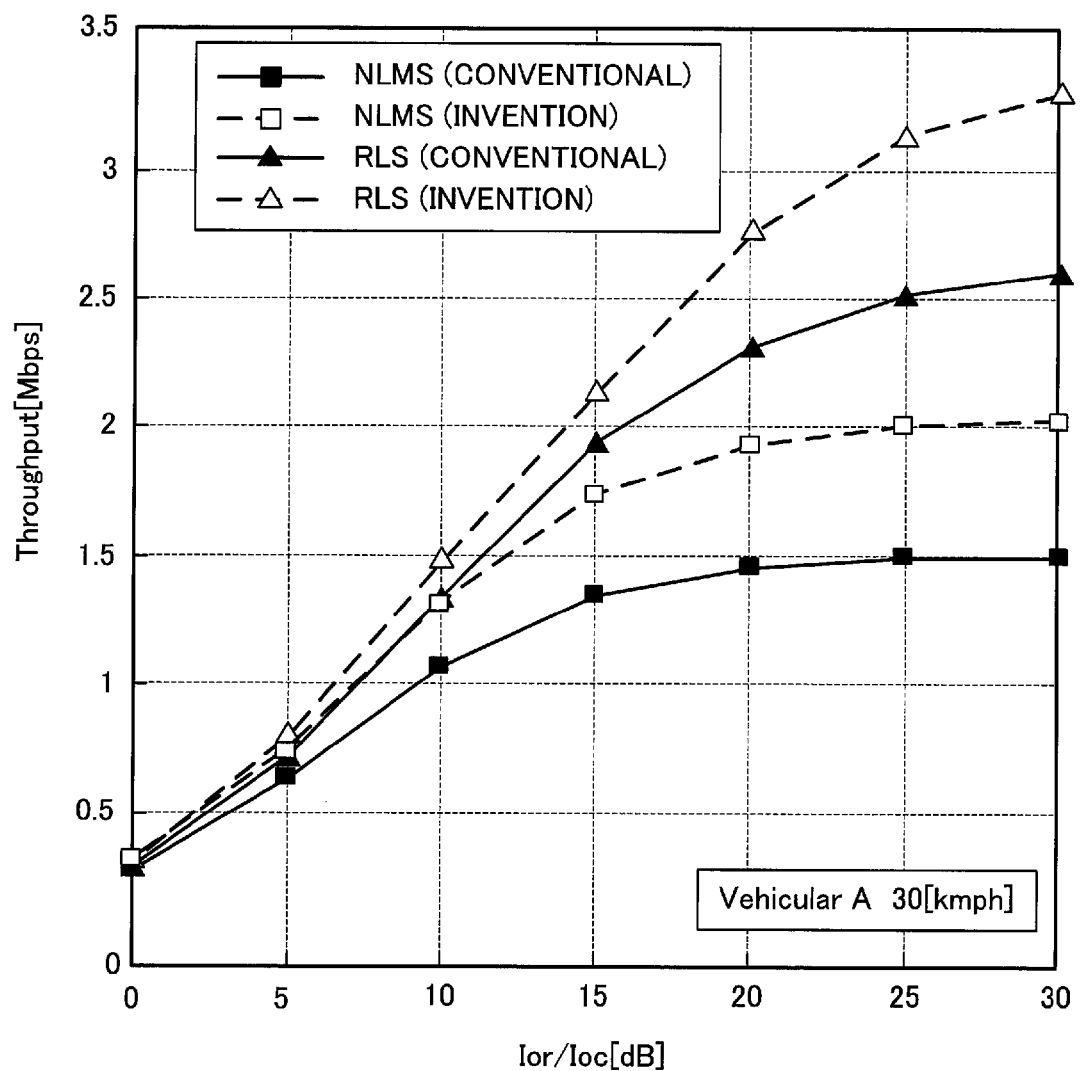
FIG. 11 shows receive throughput simulation results.

FIG. 11 shows receive throughput simulation results, wherein the horizontal axis indicates Ior/Ioc (the ratio of power received from a local cell to that received from other cells) and the vertical axis indicates the throughput of HS-DSCH (High Speed Downlink Shared Channel: a radio channel carrying user data). As adaptive algorithms, NLMS and RLS were used.

In the conventional equalizer, a pilot signal with power that accounts for 10% of the total power was used as the training signal. In the chip equalizer device 10 of the present invention, a pilot signal (CPICH) with power corresponding to 10% of the total power and a data signal (HS-DSCH) with power corresponding to 50% of the total power were used as the training signal (in total, 60%).

As seen from the figure, the device of the present invention shows superior receiving performance to the conventional equalizer in both NLMS and RLS algorithms. When Ior/Ioc is 10 dB, for example, the device of the invention provides a throughput 1.22 times (NLMS) or 1.13 times (RLS) higher than the conventional equalizer, and when Ior/Ioc is 20 dB, the device of the invention achieves a throughput 1.35 times (NLMS) or 1.23 times (RLS) higher than the conventional equalizer.

With the chip equalizer device 10 of the present invention using the CPICH and the HS-DSCH as the training signal in the HSDPA environment, the throughput can be improved 1.35 times at a maximum, compared with the conventional chip equalizer using only the CPICH as the training signal.

Figure 12:
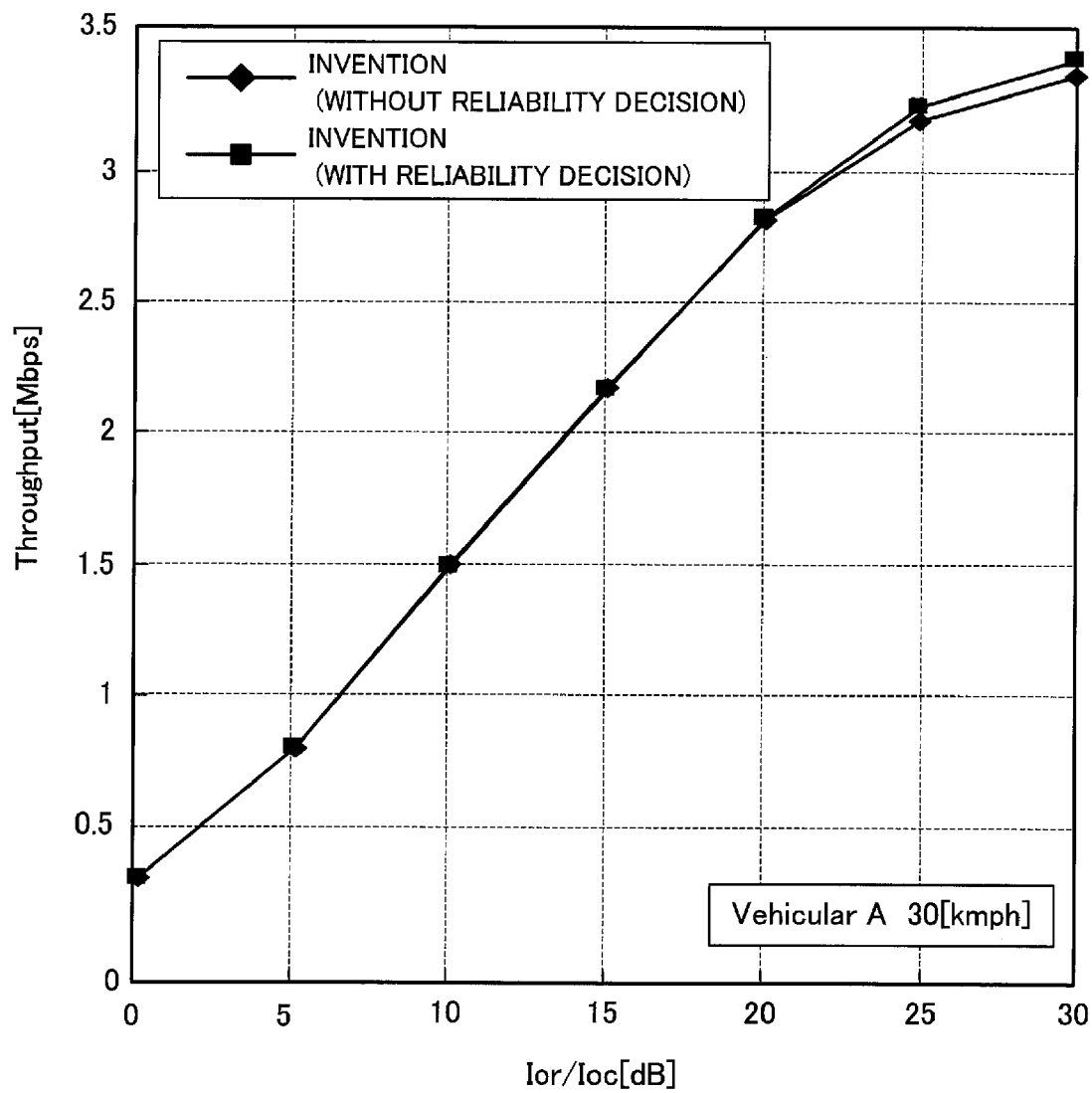
FIG. 12 shows the results of receive throughput simulation with reliability decision.
Figure 13:
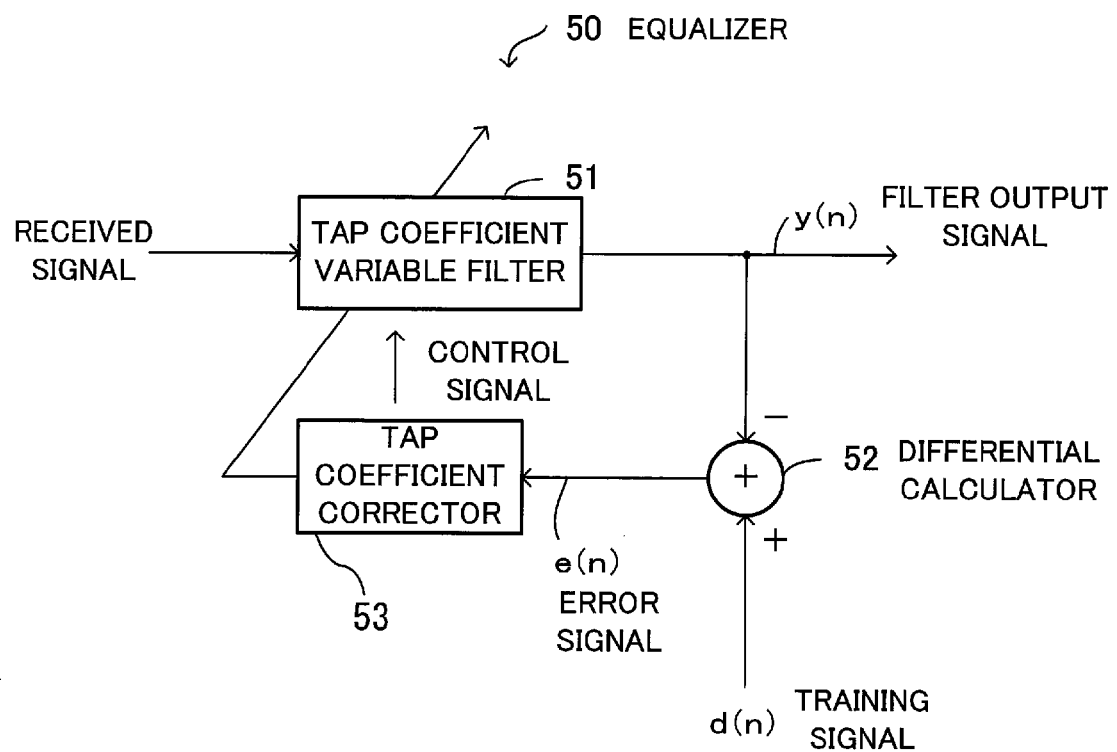
FIG. 13 shows a schematic configuration of an equalizer.

FIG. 12 shows the results of receive throughput simulation with reliability decision, wherein the horizontal axis indicates Ior/Ioc and the vertical axis indicates the throughput of the HS-DSCH.

The simulation was carried out with respect to the chip equalizer device 10-3 with the reliability decision unit 12c-1, shown in FIG. 8, under the same simulation conditions as employed in FIG. 11. The adaptive algorithm used was RLS algorithm. The figure shows that the throughput is improved by the reliability decision since the possibility that a data signal involving error is used as the training signal is reduced.

The process of deriving Equation (6) for the LMS algorithm operation will be now explained in more detail with parameters defined. Let the received signal vector at time n be r(n), the tap weight vector be w(n), and the training signal be $d_c(n)$ (=$c_p(n)+c_d(n)$). Given the equalized signal $w^H(n)r(n)$, the differential between the equalized signal and the training signal $d_c(n)$, namely, the error signal e(n), is defined as follows:

$$e(n) = d_c(n) - w^H(n)r(n) \quad (7)$$

The mean square error is employed as evaluation function J(n) (in the following equations, each pair of brackets ⟨⟩ represents a mean).

$$J(n) = \langle |e(n)|^2 \rangle \quad (8)$$
$$= \langle |d(n) - w^H(n)r(n)|^2 \rangle$$
$$= \langle (d(n) - w^H(n)r(n))^*(d(n) - w^H(n)r(n)) \rangle$$
$$= \langle (d^*(n) - r^H(n)w(n))(d(n) - w^H(n)r(n)) \rangle$$
$$= \langle |d(n)|^2 - d^*(n)w^H(n)r(n) - r^H(n)w(n)d(n) +$$
$$(r^H(n)w(n))(w^H(n)r(n)) \rangle$$
$$= \langle |d(n)|^2 \rangle - w^H(n)\langle r(n)d^*(n) \rangle - \langle d(n)r^H(n) \rangle w(n) +$$
$$w^H(n)\langle r(n)r^H(n) \rangle w(n)$$

The absolute value |z| of the complex number z=a+bj is: $|z|=(a^2+b^2)^{1/2}=(z \cdot z^*)^{1/2}$.

Given Equations (9) and (10), $$R = \langle r(n)r^H(n) \rangle \quad (9)$$

$$P = \langle r(n)d^*(n) \rangle \quad (10)$$

Equation (8) can be rewritten as follows:

$$J(n) = \langle |d(n)|^2 \rangle - w^H(n)p - p^H w(n) + w^H(n)Rw(n) \quad (11)$$

It can be seen that Equation (11) is a quadratic form of w(n). Accordingly, J(n) is differentiated with respect to w(n)= $[w_1(n), w_2(n), \ldots, w_M(n)]^T$ (M is the FIR tap length; $w_i(n)$= $a_i(n)+jb_i(n)$), that is, a complex gradient vector of J(n) is obtained; then an optimal tap weight vector is given as a solution when the complex gradient vector equals zero.

$$\nabla J(n) = \begin{bmatrix} \frac{\partial J(n)}{\partial w_1(n)} \\ \vdots \\ \frac{\partial J(n)}{\partial w_M(n)} \end{bmatrix} = \begin{bmatrix} \frac{\partial J(n)}{\partial a_1(n)} + j\frac{\partial J(n)}{\partial b_1(n)} \\ \vdots \\ \frac{\partial J(n)}{\partial a_M(n)} + j\frac{\partial J(n)}{\partial b_M(n)} \end{bmatrix} = -2p + 2Rw(n) \quad (12)$$

Thus, when Equation (12)=0, the optimal tap weight vector is given as follows:

$$w_0(n) = R^{-1}p \quad (13)$$

In this manner, the optimal tap weight vector is derived. Equation (13), however, requires an inverse matrix operation involving a large number of computations. A method is therefore adopted in which the tap weight vector is corrected each time the received signal is input. The gradient vector expression (12) gives the gradient of the tap weight vector, and accordingly, by correcting the tap weight vector in the opposite direction, it is possible to make the tap weight vector converge to the optimal tap weight vector. Specifically, the tap weight vector is corrected as indicated by the following equation:

$$w(n+1) = w(n) + \frac{1}{2}\mu[-\nabla J(n)] \quad (14)$$
$$= w(n) + \mu\{p - Rw(n)\}$$
$$= w(n) + \mu\langle r(n)d^*(n) - r(n)r^H(n)w(n) \rangle$$
$$= w(n) + \mu\langle r(n)\{d^*(n) - r^H(n)w(n)\} \rangle$$
$$= w(n) + \mu\langle r(n)\{d(n) - w^H(n)r(n)\}^* \rangle$$
$$= w(n) + \mu\langle r(n)e^*(n) \rangle$$
$$= w(n) + \mu\langle e^*(n)r(n) \rangle$$

where μ is a coefficient called step size. The procedure expressed by Equation (14) is called steepest gradient method, and the LMS algorithm employs the second term of Equation (14) as an instantaneous estimated value and is expressed by the following equation:

$$w(n+1) = w(n) + \mu \cdot e^*(n) \cdot r(n) \quad (15)$$

In the foregoing detailed description, the chip equalizer device 10 is applied to W-CDMA receiver. It is to be noted, however, that the present invention is applicable not only to W-CDMA but to other communication schemes such as OFDM (Orthogonal Frequency Division Multiplexing).

In the equalizer device of the present invention, both the data signal and the pilot signal are set as the training signal, which represents an ideal value of the equalized output, and the adaptive algorithm operation is performed so that the error signal indicative of the differential value between the training signal and the equalized filter output signal may be decreased, to correct the tap coefficients of the filter. This makes it possible to improve the tap coefficient correction accuracy, enabling high-quality adaptive equalization.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An equalizer device for performing equalization, comprising:

a tap coefficient filter to correct tap coefficients thereof in accordance with a control signal and equalize a received signal in which a data signal is multiplexed with a pilot signal, the pilot signal being a known signal for compensating for variation in reception of the data signal;

a training signal setter to set both of the data signal and the pilot signal as a training signal, the training signal indicating an ideal value of equalized output; and a tap coefficient corrector to obtain an error signal indicative of a differential value between the training signal and a filter output signal which is output from the tap coefficient filter after being equalized, perform an adaptive algorithm operation so as to decrease the error signal, and generate the control signal for correcting the tap coefficients;

wherein, where the received signal includes a plurality of data signals simultaneously multiplexed, (a) the training signal setter selects a desired data signal from among the multiplexed data signals when there is no difference in reception quality between the multiple data signals, and sets the selected data signal and the pilot signal as the training signal, and (b) the training signal setter selects a data signal with good reception quality from among the multiplexed data signals when there is a difference in reception quality between the multiple data signals, and sets the selected data signal and the pilot signal as the training signal.

2. An equalizer device for performing equalization, comprising:

a tap coefficient filter to correct tap coefficients thereof in accordance with a control signal and equalize a received signal in which a data signal is multiplexed with a pilot signal, the pilot signal being a known signal for compensating for variation in reception of the data signal;

a training signal setter to make a reliability decision to detect error in the data signal when setting a training signal indicating an ideal value of equalized output, the training signal setter setting only the pilot signal as the training signal if it is judged that the data signal involves significant error and thus is low in reliability, and set both of the data signal and the pilot signal as the training signal if it is judged that the data signal involves little error and thus is high in reliability; and a tap coefficient corrector to obtain an error signal indicative of a differential value between the training signal and a filter output signal which is output from the tap coefficient filter after being equalized, perform an adaptive algorithm operation so as to decrease the error signal, and generate the control signal for correcting the tap coefficients.

3. The equalizer device according to claim 1, wherein the tap coefficient corrector derives a sequence $d_c(n)$ of the training signal at time n as $$d_c(n)=c_p(n)+c_d(n)$$

where $c_p(n)$ and $c_d(n)$ are sequences of the pilot and data signals, respectively, at the time n, and performs the adaptive algorithm operation represented by $$w(n+1)=w(n)+\mu \cdot (d_c(n)-w^H(n)r(n))^* \cdot r(n)$$

where r(n) is a vector of the received signal, w(n) is a vector of the tap coefficients, $\mu$ is a step size, and $w^H(n)r(n)$ is a vector of the filter output signal (H indicates Hermitian transpose, and * indicates complex conjugate).

4. An adaptive algorithm operation method performed by an equalizer device, comprising:

correcting tap coefficients of a filter in accordance with a control signal and equalizing a received signal in which a data signal is multiplexed with a pilot signal, the pilot signal being a known signal for compensating for variation in reception of the data signal;

setting both of the data signal and the pilot signal as a training signal, the training signal indicating an ideal value of equalized output; and obtaining an error signal indicative of a differential value between the training signal and a filter output signal after being equalized, performing an algorithm operation so as to decrease the error signal, and generating the control signal for correcting the tap coefficients;

wherein, where the received signal includes a plurality of data signals simultaneously multiplexed, (a) a desired data signal is selected from among the multiplexed data signals when there is no difference in reception quality between the multiple data signals, and the selected data signal and the pilot signal are set as the training signal, and (b) a data signal with good reception quality is selected from among the multiplexed data signals when there is a difference in reception quality between the multiple data signals, and the selected data signal and the pilot signal are set as the training signal.

5. The adaptive algorithm operation method according to claim 4, wherein, a sequence $d_c(n)$ of the training signal at time n is derived by $$d_c(n)=c_p(n)+c_d(n)$$

where $c_p(n)$ and $c_d(n)$ are sequences of the pilot and data signals, respectively, at the time n, and the algorithm operation is performed by $$w(n+1)=w(n)+\mu \cdot (d_c(n)-w^H(n)r(n))^* \cdot r(n)$$

where r(n) is a vector of the received signal, w(n) is a vector of the tap coefficients, $\mu$ is a step size, and $w^H(n)r(n)$ is a vector of the filter output signal (H indicates Hermitian transpose, and * indicates complex conjugate).

6. An adaptive algorithm operation method performed by an equalizer device, comprising:

correcting tap coefficients of a filter in accordance with a control signal and equalizing a received signal in which a data signal is multiplexed with a pilot signal, the pilot signal being a known signal for compensating for variation in reception of the data signal;

making a reliability decision to detect error in the data signal when setting a training signal indicating an ideal value of equalized output, setting only the pilot signal as the training signal if it is judged that the data signal involves significant error and thus is low in reliability, and setting both of the data signal and the pilot signal as the training signal if it is judged that the data signal involves little error and thus is high in reliability; and obtaining an error signal indicative of a differential value between the training signal and a filter output signal after being equalized, performing an algorithm operation so as to decrease the error signal, and generating the control signal for correcting the tap coefficients.

7. The adaptive algorithm operation method according to claim 6, wherein, a sequence $d_c(n)$ of the training signal at time n is derived by $$d_c(n) = c_p(n) + c_d(n)$$

where $c_p(n)$ and $c_d(n)$ are sequences of the pilot and data signals, respectively, at the time n, and the algorithm operation is performed by $$w(n+1) = w(n) + \mu \cdot (d_c(n) - w^H(n)r(n))^* r(n)$$

where r(n) is a vector of the received signal, w(n) is a vector of the tap coefficients, $\mu$ is a step size, and $w^H(n)r(n)$ is a vector of the filter output signal (H indicates Hermitian transpose, and * indicates complex conjugate).

* * * * *